United States Patent
Böck et al.

(10) Patent No.: US 12,031,567 B2
(45) Date of Patent: Jul. 9, 2024

(54) CONNECTING DEVICE

(71) Applicant: Boeck GmbH, Leipheim (DE)

(72) Inventors: Jochen Böck, Stuttgart (DE); Marc Böck, Nuremberg (DE)

(73) Assignee: Boeck GmbH, Leipheim (DE)

( * ) Notice: Subject to any disclaimer, the term of this patent is extended or adjusted under 35 U.S.C. 154(b) by 841 days.

(21) Appl. No.: 16/982,195

(22) PCT Filed: Mar. 19, 2019

(86) PCT No.: PCT/EP2019/056745
§ 371 (c)(1),
(2) Date: Oct. 22, 2020

(87) PCT Pub. No.: WO2019/179964
PCT Pub. Date: Sep. 26, 2019

(65) Prior Publication Data
US 2021/0040970 A1  Feb. 11, 2021

(30) Foreign Application Priority Data

Mar. 19, 2018 (DE) .................. 10 2018 106 347.4

(51) Int. Cl.
*B24B 23/02* (2006.01)
*F16B 5/06* (2006.01)
*F16B 5/10* (2006.01)

(52) U.S. Cl.
CPC ............... *F16B 5/10* (2013.01); *B24B 23/02* (2013.01); *F16B 5/0664* (2013.01)

(58) Field of Classification Search
CPC ..... B24B 45/006; B24B 23/022; G03B 17/14; Y10T 403/7005
See application file for complete search history.

(56) References Cited

U.S. PATENT DOCUMENTS 6,116,996 A * 9/2000 Yanase ............... B24B 45/006
451/508
6,164,863 A * 12/2000 Hedley ............... F16B 21/02
24/575.1
(Continued)

FOREIGN PATENT DOCUMENTS

DE  20 2008 009 525 U1  11/2009
DE  10 2015 110 115 A1  12/2016
(Continued)

OTHER PUBLICATIONS

International Search Report with English translation, issued in International Application No. PCT/EP2019/056745, dated Aug. 30, 2019, European Patent Office, Rijswijk, Netherlands.
(Continued)

*Primary Examiner* — Joshua T Kennedy
(74) *Attorney, Agent, or Firm* — Crowell & Moring LLP

(57) ABSTRACT

A connecting device may be provided comprising a positive connecting element and a negative connecting element, wherein the positive connecting element has an elevation arranged on a base surface and the negative connecting element has a depression introduced into a contact surface, into which the elevation of the positive connecting element can be introduced, wherein the positive and the negative connecting element may be connected to one another by rotation relative to one another.

16 Claims, 7 Drawing Sheets

(56) References Cited

U.S. PATENT DOCUMENTS

| | | | |
|---|---|---|---|
| 6,302,617 B1 * | 10/2001 | Rumpp | F16B 21/02 |
| | | | 403/348 |
| 6,523,214 B1 * | 2/2003 | Kaiser | B24D 9/08 |
| | | | 451/515 |
| 7,192,338 B2 * | 3/2007 | Kausch | B24D 5/16 |
| | | | 451/514 |
| 7,789,735 B2 | 9/2010 | Weiland | |
| 2007/0167119 A1 * | 7/2007 | Momosaki | B24B 45/006 |
| | | | 451/359 |
| 2010/0009613 A1 | 1/2010 | Frueh | |
| 2016/0375541 A1 | 12/2016 | Weber | |
| 2017/0252899 A1 * | 9/2017 | Bechtold | B24D 7/16 |
| 2017/0348780 A1 * | 12/2017 | Zhang | B23D 61/006 |
| 2021/0205944 A1 * | 7/2021 | Kim | B24B 45/00 |

FOREIGN PATENT DOCUMENTS

| | | | |
|---|---|---|---|
| EP | 0 904 896 A2 | 3/1999 | |
| EP | 904896 A2 * | 3/1999 | ............. B24B 23/02 |
| EP | 1 795 301 A1 | 6/2007 | |
| EP | 1795301 A1 * | 6/2007 | ............. B24B 23/02 |
| EP | 1 910 024 B1 | 7/2010 | |
| EP | 2792450 B1 | 12/2015 | |
| EP | 3 108 999 A2 | 12/2016 | |
| IT | UA 20161640 A1 | 9/2017 | |
| JP | H02123922 A | 5/1990 | |
| JP | H11099460 A | 4/1999 | |
| JP | 2007054933 A | 3/2007 | |
| JP | 3204925 U | 6/2016 | |
| WO | WO 2007/023688 A1 | 1/2007 | |
| WO | WO-2007023688 A1 * | 3/2007 | ............... B24D 7/16 |

OTHER PUBLICATIONS

Notice of Reasons for Refusal with English Translation, dated May 31, 2023, pp. 1-11, Issued in Japanese Patent Application No. 2021-500340, Japan Patent Office, Chiyoda Tokyo, Japan.

Japanese Office Action with English Translation, dated Dec. 14, 2022, pp. 1-10, Issued in Japanese Patent Application No. 2021-500340, Japan Patent Office, Chiyoda Tokyo, Japan.

* cited by examiner

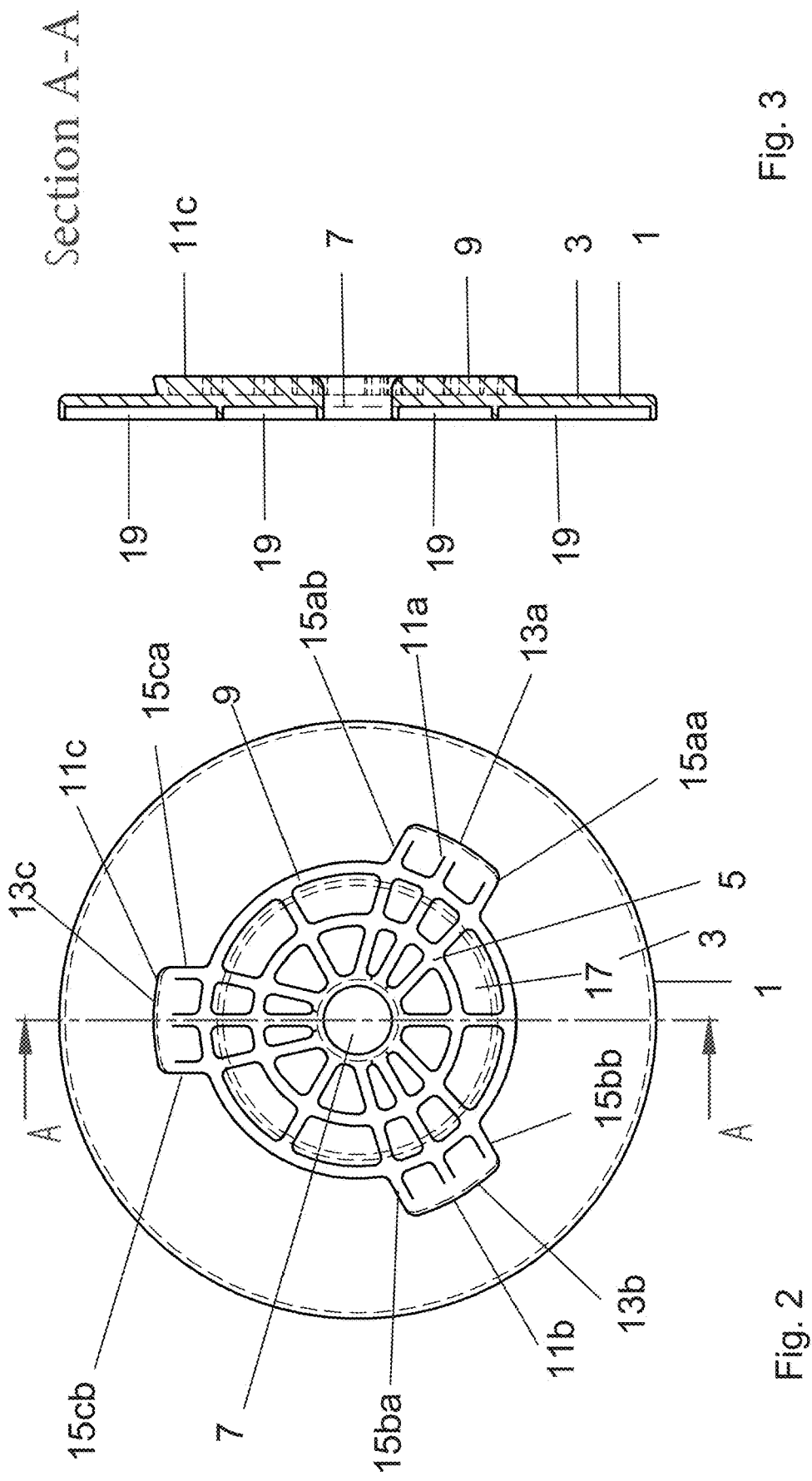

CONNECTING DEVICE

CROSS-REFERENCE TO RELATED APPLICATIONS

This application is a 371 nationalization of international patent application PCT/EP2019/056745 filed Mar. 19, 2019, which claims priority under 35 USC § 119 to German patent application DE 10 2018 106 347.4 filed Mar. 19, 2018. The entire contents of each of the above-identified applications are hereby incorporated by reference.

BRIEF DESCRIPTION OF THE DRAWINGS

In the figures:

FIG. 2 shows a plan view of the positive connecting element,

FIG. 3 shows a sectional view of the positive connecting element shown in FIG. 2.

DETAILED DESCRIPTION

Figure 1:
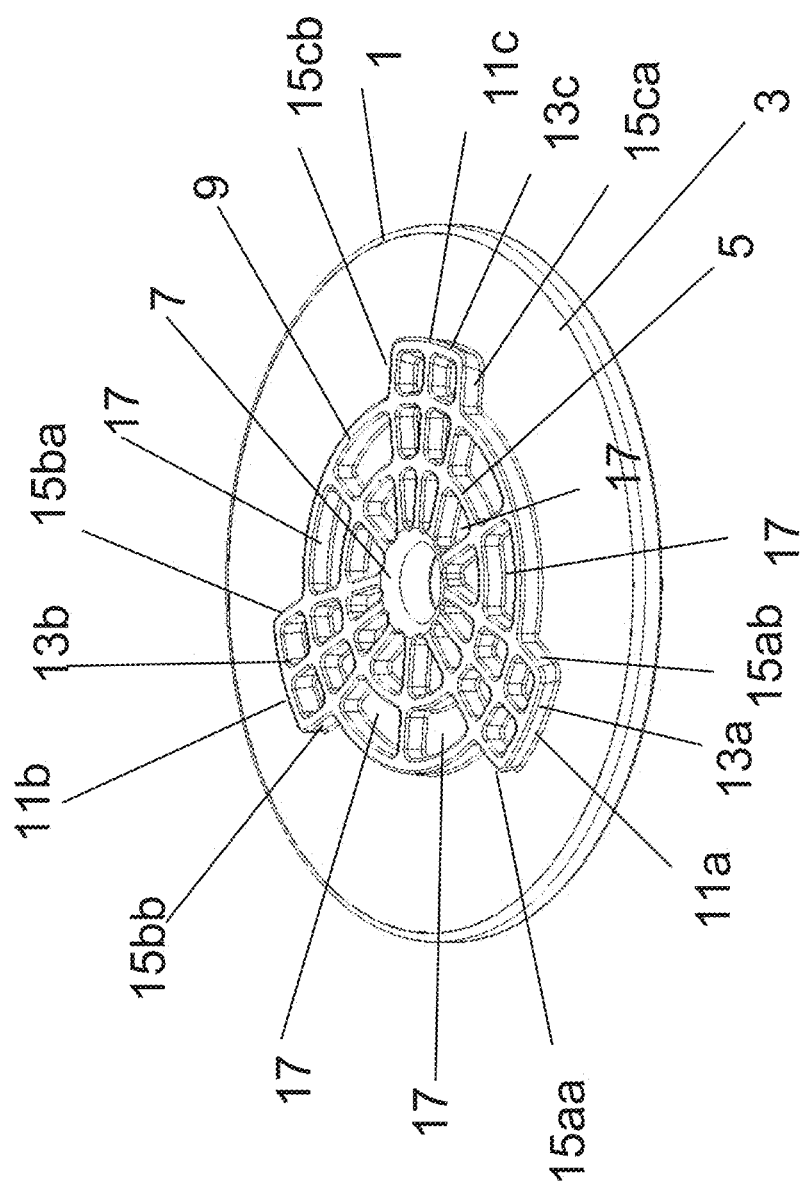
FIG. 1 shows a perspective view of a positive connecting element.

The invention relates to a connecting device having a positive connecting element and a negative connecting element, wherein the positive connecting element has an elevation arranged on a base area and the negative connecting element has a depression which has been introduced in a contact surface and into which the elevation of the positive connecting element can be introduced, wherein the positive and the negative connecting element can be connected to one another by being rotated relative to one another.

The minimization of setup times constitutes a typical aim of continuous improvement processes. Therefore, inter alia, solutions for a quick exchange of tools are sought. The interface of a machining machine between the positioning elements and the tool constitutes what is known as the tool clamping system. The tool clamping system has to satisfy all technical requirements, such as accuracy, direction of rotation, balancing quality, transmission of forces and moments, etc.

It is standard practice for tools to be connected to the tool receptacle by way of releasable connections (e.g. screws). Quick-action fasteners with a screw contour constitute another solution. Said fastening method forces a direction of rotation owing to the screw contour, in order to prevent releasing due to the rotation. The screw contour results in the need to compensate for the imbalance.

DE 10 2015 110 115/EP 3 108 999 claims a device for machining a workpiece that utilizes the aforementioned screw contour and is attached to a rectangular body outside the center of the rectangular face. The off-center design leads to a fixing of the connecting elements during the machining process.

IT UA 20161640 claims a similar screw contour which is offset point-symmetrically three times at an angle of 120°. This embodiment has radial grooves on the base area which correspond to the number of screw contours and are used for locking. The locking is brought about by ball thrust pieces which have been introduced in turn in the counterpart.

Furthermore, what are known as plug-in couplings exist. Axial releasing is secured against by way of a transverse bolt or ball elements arranged in a circle, which ball elements can be released and fixed by way of a normally spring-loaded, displaceable sleeve and are pressed into a corresponding groove of the counterpart. The transmission of moments can be performed on the one hand by way of a transverse bolt or a non-rotationally symmetrical element (e.g. hexagon) having a corresponding counterpart. This type of tool fastening requires the mounting of a tool-side adapter.

Furthermore, plug-in connections such as in EP20130186867 or screw connections, inter alia, also having guide strips to secure against rotation such as in EP 1 910 024 exist.

In addition, what are known as jaw couplings are used, inter alia, in the field of sanitary engineering. The functional principle is based on the mutual engagement of two opposite jaws which are connected to one another by rotation. In order to prevent releasing, the jaws are provided with barbs. The connection has to be axially elastic (e.g. seal, spring, etc.), since the barbs have to latch into place.

A bayonet closure is used when coupling a camera to a lens. The lens is connected to the lens receptacle on the camera by rotating it. The lens latches into place by means of a rotation of normally 60 to 90 degrees. In order to release the lens, an actuating button which unlocks the lens is required.

The rotary closure, also called a twist-off screw lid, is used when screwing on preserve jars. Rotary lids are standardized in accordance with DIN EN ISO 9100. By contrast to screw lids, the lugs, which are under spring tension after closing, bring about a particularly secure closure of the containers.

It is an object of the present invention to specify a connecting device which is configured in such a way that two connecting elements can be connected to one another by rotation such that torques in both directions about an axis of rotation can be transmitted from one connecting element to the other.

According to the invention, a connecting device is provided which has a first connecting element, referred to as a positive connecting element, and a second connecting element, referred to as a negative connecting element.

The positive connecting element has a base area on which an elevation is arranged. In this case, the elevation can advantageously form a shoulder on the base area. In particular, the elevation can be formed in the manner of a mesa on the base area. Advantageously, the base area can be substantially planar.

According to the invention, the elevation has n pegs, wherein n is an integer greater than or equal to 2. The n pegs are arranged here about a common imaginary center axis which is perpendicular to the base area. Each of the pegs has an end face which delimits said peg in the radial direction with respect to the center axis.

In one advantageous configuration, the pegs can each be configured as parts of the elevation that project beyond a base body or central region of the elevation in a delimited angular range in the radial direction.

According to the invention, the end faces of the pegs enclose at least one angle of less than 90° with the base area in each case. The end faces thus form at least an acute angle with the base area in each case, as a result of which part of the elevation may project beyond the base area. The angle can be the radially outwardly directed angle here; the angle thus lies outside the connecting element. The elevation may advantageously have a central region which encloses the center axis and particularly advantageously has an edge which runs in a circular manner around the center axis. The pegs can then be considered to be arranged on and protrude beyond said edge.

The pegs advantageously have radial side faces which respectively abut the ends of the end faces in the circumferential direction. The radial side faces of the same peg preferably each enclose an angle about the center axis of greater than or equal to 5°, particularly preferably greater than or equal to 10°, particularly preferably of 15° and/or of less than or equal to 25°, particularly preferably less than or equal to 20°. In this configuration, the angle between the side faces of the respective peg together with the spacing between the end face and the center axis determines the length of the end face in the circumferential direction about the center axis.

Particularly advantageous is a configuration in which the central region mentioned of the elevation has a circular circumference about the center axis and the pegs each extend over the edge of the central region by way of radial side faces and an end face extending between said side faces along a circular line. Advantageously, a surface of the elevation that faces away from the base area is parallel to the course of the base area and/or planar.

According to the invention, the negative connecting element has a contact surface with a depression which has been introduced in the contact surface. The contact surface is provided to bear against the base area of the positive connecting element in the connected state. The contact surface can therefore advantageously be configured such that, in the connected state, it runs parallel to the base area of the positive connecting element that faces the negative connecting element. The contact surface may particularly preferably be planar.

According to the invention, the depression is delimited in the radial direction with respect to a depression axis perpendicular to the contact surface by an inner wall of the depression. The inner wall of the depression may here advantageously extend from a bottom surface of the depression as far as the contact surface. The axes mentioned here are intended to be understood as imaginary axes for the purpose of orientation.

According to the invention, the inner wall has n insert portions, preferably exactly n, which respectively have an insert radius with respect to the depression axis. The insert radius is thus the spacing between the inner wall in the region of the insert portion and the depression axis. Here, in turn, a number greater than or equal to 2 is labelled with n. According to the invention, the inner wall additionally has 2n retaining portions, preferably exactly 2n, wherein one of the retaining portions in each case adjoins each of the n insert portions in both directions along the inner wall about the depression axis. One of the retaining portions in each case may thus adjoin each of the insert portions in both circumferential directions about the depression axis.

In the region of each of the retaining portions, the inner wall encloses an angle of greater than 270° with the contact surface. Here, for example, that region of the surface of the negative connecting element that is oriented upwardly in the direction of the depression axis and in which the depression is not present can be considered to be the contact surface. If the depression is downwardly delimited by a bottom surface, the inner wall can thus enclose an angle of less than 90°, that is to say an acute angle, with said bottom surface in the region of each of the retaining portions. What is advantageously meant here are those angles lying outside the negative connecting element. The bottom surface can advantageously be configured here such that, in the connected state, it runs parallel to the surface of the elevation of the positive connecting element and/or is planar. The bottom surface can optionally have structures which have been introduced in the bottom surface, such that the bottom surface in this case runs parallel and/or is parallel to the surface of the elevation in the region outside structures of this type.

In the region of each of the retaining portions, the inner wall has a maximum spacing, referred to as the retaining spacing, from the depression axis that is smaller than the insert radius, that is to say the spacing between the inner wall and the depression axis in the insert portions. Advantageously, the retaining spacing can be the spacing of the inner wall in the region of the retaining portions at that point at which the inner wall adjoins the contact surface.

In a state in which the positive connecting element is connected to the negative connecting element, a spacing between the end faces of the pegs and the center axis is intended to be smaller than or equal to the insert radius, with the result that the pegs can be introduced into the depression at the insert portions. In addition, the spacing between the end faces of the pegs and the center axis is intended to be larger than the retaining spacing described. If first the pegs are introduced into the depression at the insert portions and then the positive connecting element is rotated with respect to the negative connecting element such that the pegs lie on the inner wall of the depression in the region of the retaining portions, as a result the elevation of the positive connecting element is held in the depression. By virtue of the fact that the retaining portions respectively adjoin the insert portions on both sides, such a retaining state can be achieved by rotating the positive connecting element with respect to the negative connecting element in both directions about the depression axis or the center axis.

In one advantageous configuration of the invention, the end faces of the pegs and advantageously the pegs themselves can be symmetrical with respect to a center of the respective end face in each case in a direction along a circumference about the center axis. In this case, that angle which is specifically the angle bisector of that angle in which the side faces of the corresponding peg extend, or the center of any line segment along the circumference along which the end face extends, can, for example, be considered to be the center of the end face.

In one advantageous configuration of the invention, all respectively adjacent pegs can enclose the same angle with respect to one another.

In particular, all centers of the end faces of respectively adjacent pegs can enclose the same angle about the center axis with respect to one another. Correspondingly, respectively adjacent insert portions and/or centers of adjacent insert portions can each enclose the same angle about the depression axis. In this configuration, the connecting device can be realized without imbalance for rotating applications.

In one advantageous configuration of the invention, the end faces of the pegs can run about the center axis in an n-fold rotationally symmetrical manner. Correspondingly, the insert portions of the negative connecting element can also run about the depression axis in an n-fold rotationally symmetrical manner. By virtue of this configuration, too, the connecting device can be realized free of imbalance for rotating applications.

In one advantageous configuration of the invention, the angle which the end faces enclose with the base area may decrease from a center of the end face to an edge of the end face in the direction of the circumference about the center axis. In this configuration, the angle which the retaining portions enclose with the contact surface or optionally the bottom surface of the depression may be constant. By virtue of the changing angle of the end faces, the positive connecting element can be fixed in the depression.

Advantageously, all end faces of the pegs may run parallel to a common circular line. Particularly preferably, all end faces run when viewed at a given spacing from the base area on a common circular line.

In one advantageous configuration of the invention, the base area may have a circular circumference; other circumference geometries are however also possible, such as for example square or rectangular.

In one advantageous configuration of the invention, the angle which the inner wall of the depression encloses with the contact surface in the region of the retaining portions, as seen from the respective insert portion adjoined by the corresponding retaining portion, may increase. If the depression has a bottom surface which downwardly delimits it, in a corresponding manner the angle which the inner wall encloses with said bottom surface in the region of the retaining portions can decrease as seen proceeding from the respective insert portion. By virtue of this configuration, it can be achieved that the positive connecting element is fixed by rotation about the depression axis or the center axis after being inserted in the region of the insert portions.

In one advantageous configuration of the invention, the inner wall of the depression adjoining each of the retaining portions can have a stop region. In this case, the stop region can delimit the respective retaining portion at its end facing away from that insert portion which is adjoined by the corresponding retaining portion. In the region of this stop region, the inner wall can have a spacing from the depression axis that is smaller than the smallest spacing between the inner wall and the depression axis in the region of the corresponding retaining portion. The corresponding peg of the positive connecting element can abut this stop region when the positive connecting element is being rotated with respect to the negative connecting element after being inserted in the insert region and after passing through the retaining region, with the result that over-rotation is prevented.

In one advantageous configuration, the contact surface can have a circular circumference, but it is also possible for the contact surface to have a square or rectangular or differently shaped circumference.

Particularly advantageously, the negative connecting element can have a shaped element, wherein the shaped element is delimited in the radial direction by a cylindrical wall, the cylinder axis of which is perpendicular to the contact surface and projects beyond a plane in which the contact surface extends. The cylinder axis of said shaped element is preferably coaxial to the depression axis. In a corresponding manner, the positive connecting element can then have an opening around the center axis, the internal diameter of which is identical to the external diameter of the cylindrical wall. As an alternative, the positive element may be a shaped element, wherein the shaped element is delimited by a cylindrical wall, the cylinder axis of which is perpendicular to the base area and which shaped element projects beyond the surface of the elevation. The cylinder axis is preferably coaxial to the center axis. The negative connecting element can then have an opening around the depression axis, the internal diameter of which is identical to the external diameter of the cylindrical wall of the shaped element.

In one particularly advantageous configuration of the invention, the positive connecting element can have an abrading means on a side of the base area that faces away from the elevation or the negative connecting element can have an abrading means on its side facing away from the depression. Advantageously, the connecting device can be configured as a tool clamping system.

In one advantageous configuration of the invention, there may have been introduced in the bottom of the depression bores into which pins for selecting the permitted direction of rotation of the positive connecting element with respect to the negative connecting element can be inserted. In this case, the bores are preferably arranged such that, when the positive connecting element has been inserted in the negative connecting element, pins which have been inserted in the bores butt against one of the side faces of the pegs. Advantageously, the spacing between the bores and the depression axis is smaller than the spacing between the inner wall and the depression axis, but is optionally larger than a spacing between an optionally provided central region of the positive connecting element and the center axis.

The invention makes it possible to connect two connecting elements by being rotated into place in both directions. By virtue of the advantageous symmetrical structure, the invention is advantageous with respect to the mass center of gravity or imbalance, since, in the case of a rotating embodiment, the center of gravity lies on the axis of rotation which can correspond to the center axis or the depression axis.

The invention of a figures is intended to be explained by way of example below. The features shown in the figures may also be realized independently of the specific figure and may be combined among different figures. The same reference signs identify identical or corresponding features.

FIG. 1 and FIG. 2 show a positive connecting element according to the invention. The positive connecting element 1 has a base area 3 which, in the example shown, has a circular circumference and is planar. An elevation 5 is arranged on the base area 3. The elevation 5 and the base area 3 have a central through-opening 7 which, in the example shown, is configured as circular about a center axis, about which the base area 3 and a central region 9 of the elevation run in a radially symmetrical manner.

In the example shown, the elevation 5 has three pegs 11a, 11b and 11c, which are arranged about the common center axis. Said common center axis is an imaginary axis here, which is perpendicular to the base area 3.

Each of the pegs has an end face 13a, 13b and 13c which delimit said pegs 11a, 11b, 11c in the radial direction with respect to the center axis.

The end faces 13a, 13b and 13c enclose an angle of less than 90°, that is to say an acute angle, with the base area 3 in each case.

The central region 9 as well as the end faces 13a, 13b and 13c follow in their course a circular shape, through the center point of which the center axis runs. In the region of the pegs 11a, 11b, 11c, the elevation 5 has a larger radial extent with respect to the center axis than in the regions of the central region 9 which lie in between.

The pegs 11a, 11b and 11c have in each case two side faces 15aa, 15ab, 15bb, 15ba, 15cb, 15ca which, in the example shown, run such that the side faces 15aa, 15ab of the same peg 11a each lie parallel to one another. It is however also advantageous when the side faces 15*aa*, 15*ab*, 15*bb*, 15*ba*, 15*cb*, 15*ca* respectively run in the radial direction with respect to the center axis. In this case, the side faces 15*aa*, 15*ab* of the same peg 11*a* can respectively enclose an angle of for example 15°. If statements are made here with respect to a single peg 11*a*, they apply advantageously and correspondingly to the other pegs 11*b* and 11*c*.

In the example shown in FIG. 1, the elevation 5 has a multiplicity of recesses 17, between which struts are formed. The recesses 17 are optional and serve to reduce the weight of the connecting element.

In the example shown, the pegs 11*a*, 11*b* and 11*c* are each symmetrical with respect to a center of the corresponding end face 13*a*, 13*b*, 13*c* in the direction of the circumference about the center axis. The pegs 11*a*, 11*b*, 11*c* are moreover arranged equidistantly in the circumferential direction such that all respectively adjacent pegs 11*a*, 11*b*, 11*c* and/or all centers of the end faces 13*a*, 13*b*, 13*c* of respectively adjacent pegs enclose the same angle about the center axis with respect to one another. In general, said angle is advantageously equal to 360°/n, that is to say 120° in the example shown in FIG. 1 with three pegs. It can be seen that the end faces 13*a*, 13*b*, 13*c* together run about the center axis in a three-fold rotationally symmetrical manner.

The angle which the end faces 13*a*, 13*b*, 13*c* enclose with the base area 3 can advantageously decrease from a center of an end face 13*a*, 13*b*, 13*c* to an edge of the end face in the direction of the circumference about the center axis. This feature is optional and not shown in FIG. 1.

FIG. 3 shows a section along the section line A-A shown in FIG. 2. The section extends through the peg 11*c* and the central region 9, which is pushed through the through-opening 7. Provided on that side of the positive connecting element which is situated opposite the side shown in FIG. 2 are structures 19, here depressions 19, which encircle the center axis in a circular manner and on which, for example, abrading means can be arranged when the connecting element 1 is used as part of a tool clamping system. Abrading means of this type may be configured for example as shown in DE 10 2016 220 766.0.

Figure 4:
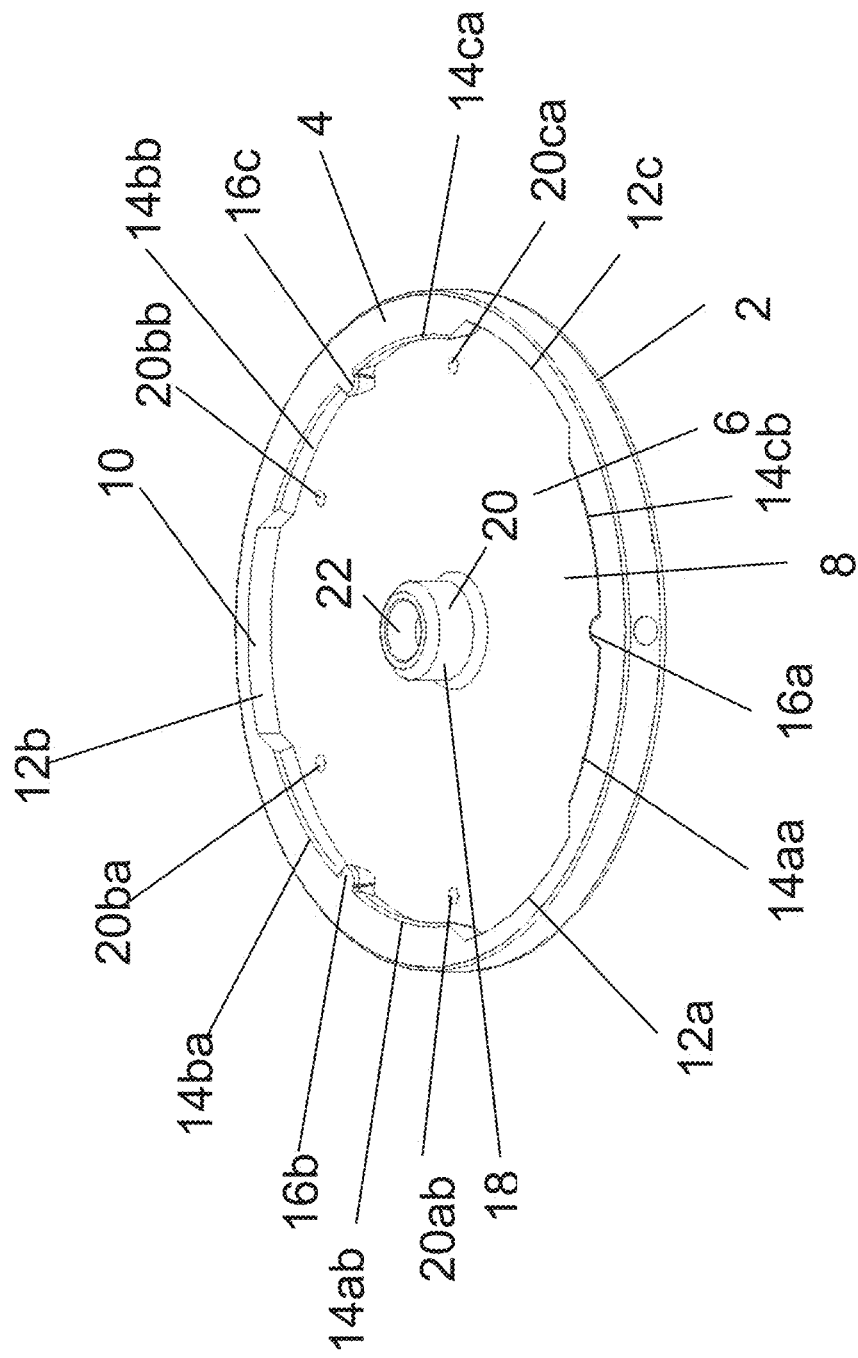
FIG. 4 shows a perspective view of a negative connecting element.
Figure 5:
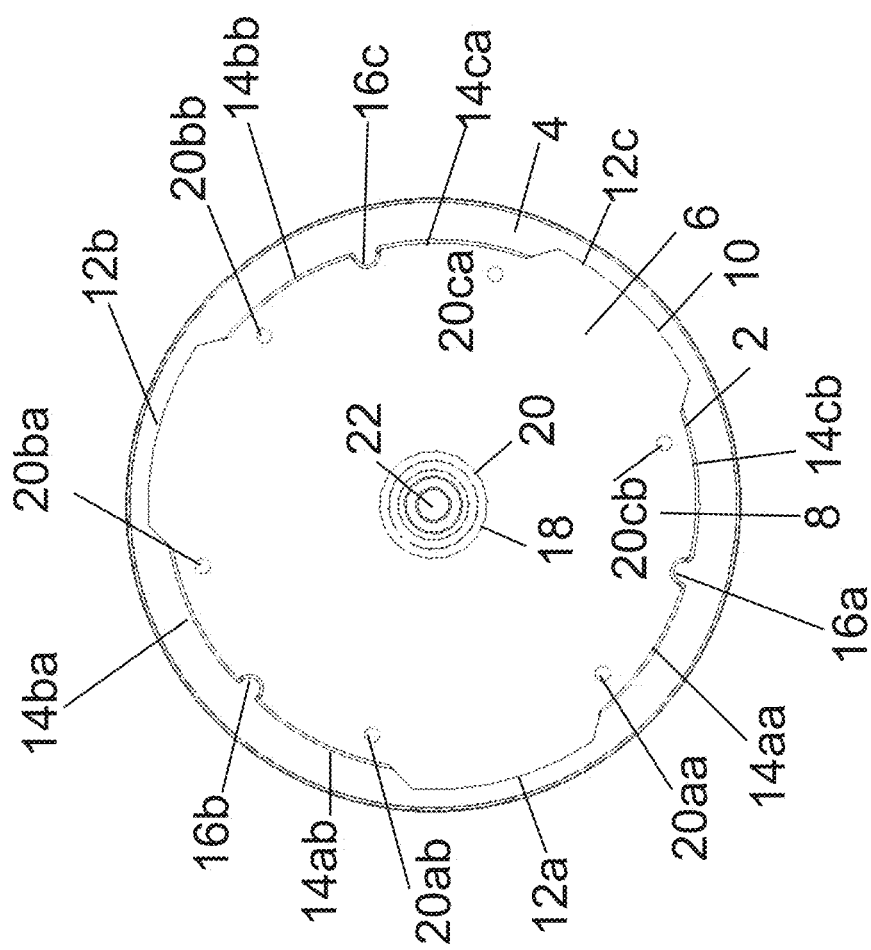
FIG. 5 shows a plan view of the negative connecting element.

FIG. 4 shows a perspective view of a negative connecting element 2 according to the present invention. FIG. 5 shows a corresponding plan view. Here, the negative element 2 has a contact surface 4 with a depression 6 which has been introduced in the contact surface. In the example shown, the depression 6 is delimited downwardly by a bottom surface 8.

The depression 6 is delimited in the radial direction with respect to a depression axis perpendicular to the contact surface 4 by an inner wall 10 of the depression. The depression axis is an imaginary axis here, which is encircled by the inner wall 10. In the example shown, the negative connecting element 2 has a circular circumference, with the result that the depression axis runs through the center point of said circular circumference here.

In the example shown, the inner wall 10 has three insert portions 12*a*, 12*b* and 12*c* which have what is known as an insert radius with respect to the depression axis. Furthermore, the inner wall 10 has six retaining portions 14*aa*, 14*ab*, 14*ba*, 14*bb*, 14*ca*, 14*cb* which are arranged such that one of the retaining portions 14*aa*, 14*ab*, 14*ba*, 14*bb*, 14*ca*, 14*cb* in each case adjoins each of the three insert portions 12*a*, 12*b*, 12*c* in both directions along the inner wall 10 about the depression axis. Thus, for example, the insert portion 12*a* is adjoined in the anticlockwise direction by the retaining portion 14*aa* and in the clockwise direction by the retaining portion 14*b*. The same applies correspondingly for the other insert portions 12*b* and 12*c*.

The inner wall 10 encloses an angle of greater than 270° with the contact surface 4 in the region of each of the retaining portions 14*aa*, 14*ab*, 14*ba*, 14*bb*, 14*ca*, 14*cb*. The inner wall 10 correspondingly encloses an angle of less than 90° with the bottom surface 8 shown in the example.

Furthermore, in the region of each of the retaining portions 14*aa*, 14*ab*, 14*ba*, 14*bb*, 14*ca*, 14*cb*, the inner wall 10 has a maximum spacing, referred to as the retaining spacing below, from the depression axis that is smaller than the insert radius in the region of the insert portions 10. If the negative connecting element 2 shown in FIG. 4 is configured for the purpose of connection to the positive connecting element 1 shown in FIGS. 1 to 3, a spacing between the end faces 13*a*, 13*b*, 13*c* of the positive connecting element 1 and the center axis of said positive connecting element is smaller than or the same as the insert radius and greater than the said retaining spacing.

In the example shown, the inner wall 10, in a manner adjoining each of the retaining portions 14*aa*, 14*ab*, 14*ba*, 14*bb*, 14*ca*, 14*cb*, has a stop region 16*a*, 16*b*, 16*c* in the region of which the inner wall 10 has a spacing from the depression axis that is smaller than the smallest spacing between the inner wall 10 and the depression axis in the region of the retaining portions 14*aa*, 14*ab*, 14*ba*, 14*bb*, 14*ca*, 14*cb*.

The configuration shown in FIG. 4 is designed such that, in each case, a partial region of the inner wall 10 that comprises a stop region 16*a*, a first retaining portion 14*aa*, an insert region 12*a*, a second retaining region 14*ab* and a second stop region 16*b* is symmetrical in the circumferential direction about a center of the corresponding insert region 12*a*. The same applies correspondingly to the insert regions 12*b* and 12*c*.

In the example shown, the negative connecting element 2 has a shaped element 18 which is delimited by a cylindrical outer wall 20, the cylinder axis of which is perpendicular to the contact surface 4. The shaped element projects beyond a plane in which the contact surface 4 extends. This can be seen particularly well in the side view in FIG. 6. If the negative connecting element 2 shown in FIG. 4 is provided for connection to the positive connecting element 1 shown in FIGS. 1 to 3, the shaped element 18 can thus be inserted into the through-opening 7 of the positive connecting element 1 and, as a result, simplify the centering operation. The through-opening 7 of the positive connecting element 1 can correspondingly have an internal diameter which is identical to the external diameter of the cylindrical wall 2. In the example shown, the shaped element 18 has a central opening 22 which can be provided, for example, for receiving a drive shaft.

The angle which the inner wall 10 encloses with the contact surface 4 in the region of the retaining portions 14*aa*, 14*ab*, 14*ba*, 14*bb*, 14*ca*, 14*cb* increases proceeding from the respective insert portion 12*a*, 12*b*, 12*c* in the example shown in FIGS. 4 and 5. In this way, the pegs 11*a*, 11*b*, 11*c* of the positive connecting element 1 can be fixed herein until they abut the stop regions 16*a*, 16*b* and 16*c* respectively. It can be seen that this works when the positive connecting element 1 is rotated with respect to the negative connecting element 2 in both directions.

Provided in the bottom surface 8 are bores 20*ab*, 20*ba*, 20*bb*, 20*ca*, 20*cb*, into which can be inserted pins for selecting the direction of rotation in which the positive connecting element can be rotated with respect to the negative connecting element. Said bores are arranged correspondingly in front of the retaining regions 14*aa*, 14*ab*, 14*ba*, 14*bb*, 14*ca*, 14*cb* in each case.

Figure 6:
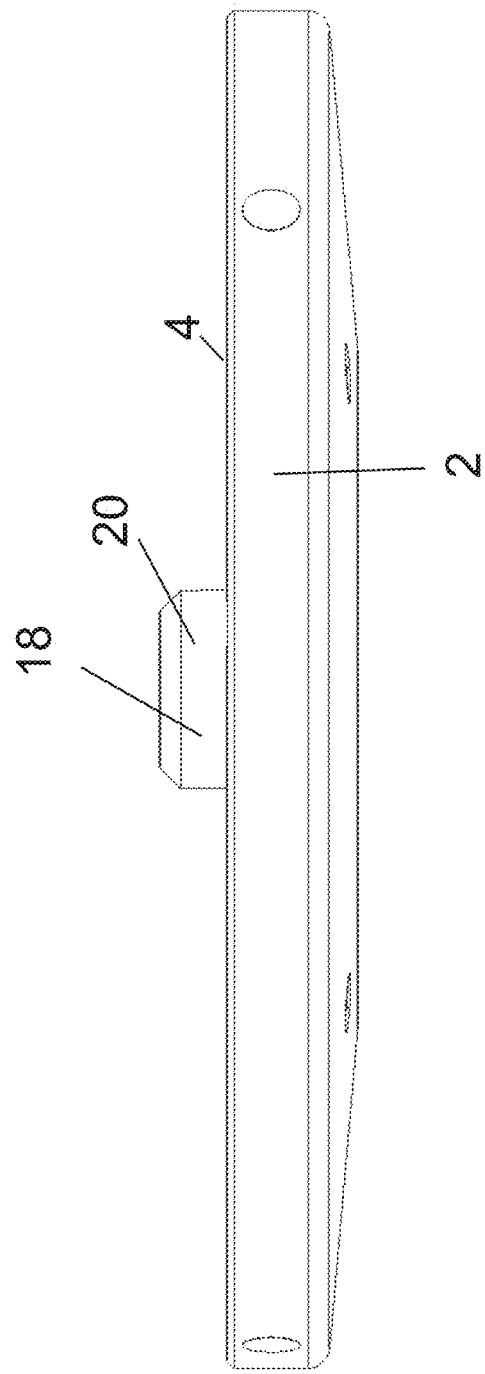
FIG. 6 shows a side view of the negative connecting element.
Figure 7:
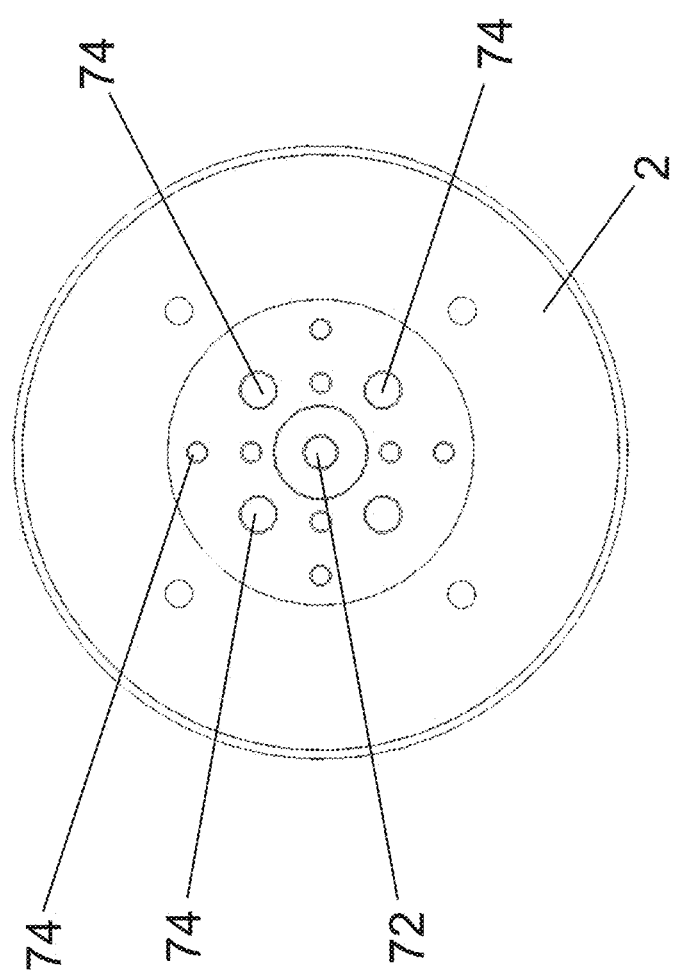
FIG. 7 shows a plan view of the negative connecting element.

FIG. 7 shows a plan view of the negative connecting element 2 shown in FIGS. 4 to 6 on its side situated opposite the contact surface 4. In a state in which the negative connecting element 2 is connected to the positive connecting element 1, the side shown in FIG. 7 faces away from the positive connecting element 1. It can be seen that the negative connecting element 2 has a central opening 72 which can be provided, for example, for the purpose of introducing a drive shaft. Furthermore, said surface has a multiplicity of further bores 74, into which drive or torque-transmission elements can be introduced. In this way, the connecting device can be used as a tool clamping system for rotating applications, such as for example for deburring.

Figure 8:
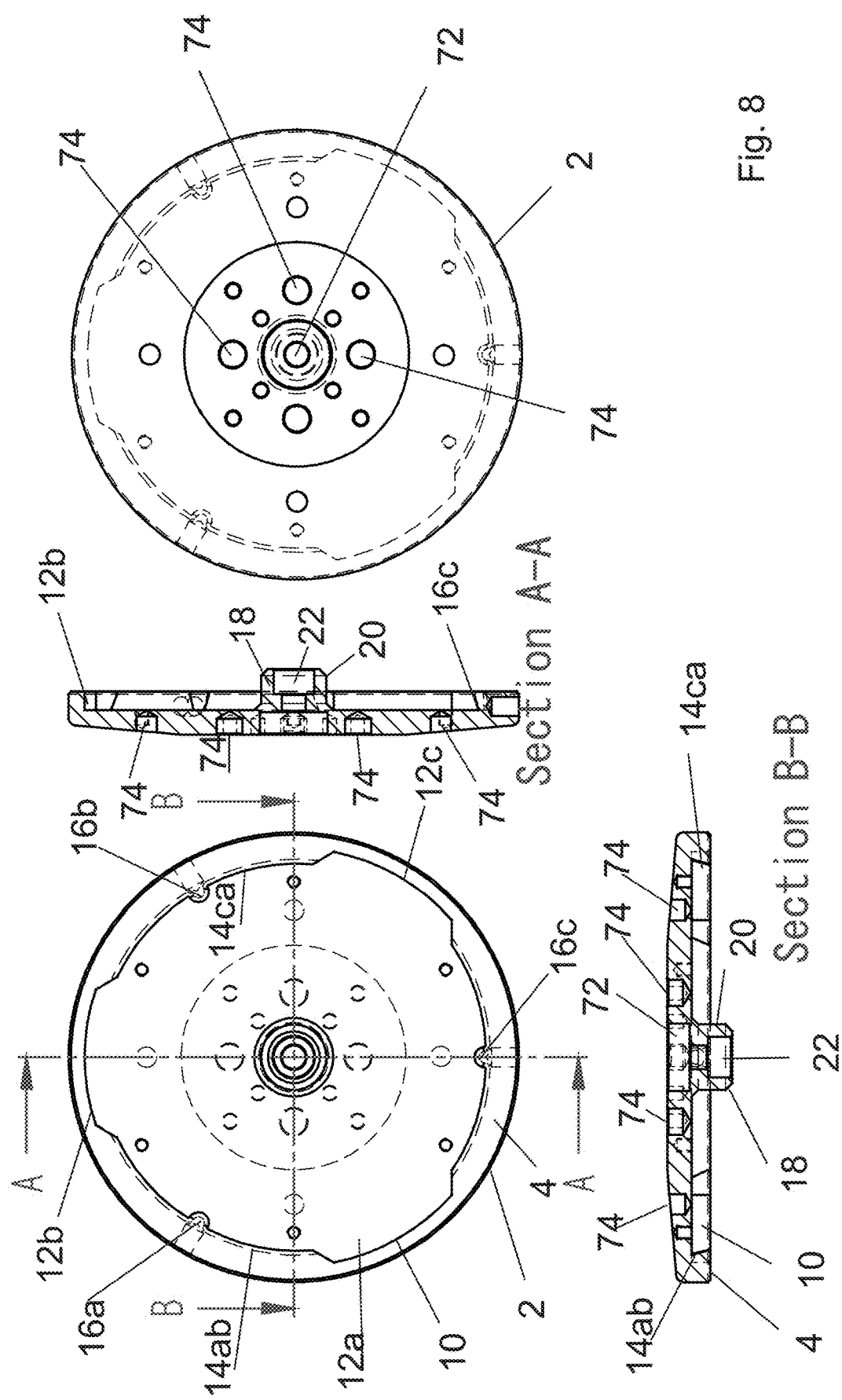
FIG. 8 shows a plan view of the negative connecting element with two sectional views which are perpendicular to one another.

FIG. 8 again shows the negative connecting element 2 shown in FIGS. 4 to 7 with a sectional view along the section axis A-A as well as a sectional view along the section axis B-B. Those bores 74 which have been applied to that side facing away from the contact surface 4, as well as the opening 73, can be seen. The section A-A runs through the stop region 16*c* and the insert region 12*b*. The section B-B runs on the one hand through the retaining region 14*ab* and on the other hand through the retaining region 14*ca*. With respect to the further features shown in FIG. 8, reference is to be made to the description with respect to FIGS. 4 to 7.

In summary, the device can thus be considered to be constructed from two connecting elements. If the connecting elements are axially joined and then rotated, a form-fitting connection is produced. Depending on the rotational movement, by virtue of the symmetrical design of the connecting elements, a connection corresponding to the desired direction of rotation can be realized. The symmetrical design is advantageous, inter alia, with respect to the imbalance, since the mass center of gravity can always lie on the axis of rotation.

In the connecting region, the elements can have a wedge-shaped geometry, for example with an angle of 15°, wherein one of the two connecting elements can have the complementary wedge geometry. While the wedge-shaped contour can be configured rotationally symmetrically on a connecting element, the other connecting element should advantageously have a tapering contour in the connecting region, in order to realize a secure or fixed connection.

In order to prevent over-rotation of the connection, over-rotation prevention elements in the form of screws, rivets or material accumulations can be used. Connection in an incorrect direction of rotation can likewise be prevented by way of screws, rivets or material accumulation.

An unintended release of the connecting elements can be prevented for example by additional securing elements. A securing element can be configured for example in the form of a latching element, such as a detent piece, pressure elements or the like.

Depressions in the form of bores, milled reliefs or the like on the connecting elements can be used for opening and closing the device.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

The invention claimed is:

1. A connecting device comprising:
    a positive connecting element and
    a negative connecting element,
    wherein the positive connecting element has a base area and an elevation arranged on the base area,
    wherein the elevation has n pegs, where n is greater than or equal to two, wherein the n pegs are arranged about a common center axis which is perpendicular to the base area,
    wherein each of the pegs has an end face which delimits said peg in the radial direction with respect to the center axis,
    wherein the end faces enclose at least one angle of less than 90° with the base area,
    wherein the negative connecting element has a contact surface with a depression which is introduced in the contact surface,
    wherein the depression is delimited in the radial direction with respect to a depression axis perpendicular to the contact surface by an inner wall of the depression,
    wherein the inner wall has n insert portions with an insert radius with respect to the depression axis,
    wherein the inner wall has 2n retaining portions, wherein each side of each of the n insert portions is adjacent to one of the 2*n* retaining portions along the inner wall such that a retaining state can be achieved by rotating the positive connecting element with respect to the negative connecting element in either direction about the depression axis or the center axis; wherein the inner wall of the depression has a stop region adjoining each of the retaining portions to delimit the respective retaining portion at its end facing away from that insert portion to which the retaining portion is adjacent
    wherein the inner wall in a region of each of the retaining portions encloses an angle of greater than 270° with the contact surface and has a maximum spacing at a point at which the inner wall adjoins the contact surface, referred to as the retaining spacing, from the depression axis that is smaller than the insert radius,
    wherein a spacing between the end faces and the center axis is smaller than or the same as the insert radius and greater than the retaining spacing.

2. The connecting device as claimed in claim 1, wherein the pegs are each symmetrical with respect to a center of the corresponding end face in the direction of a circumference about the center axis.

3. The connecting device as claimed in claim 1, wherein all respectively adjacent pegs and/or all centers of the end faces of respectively adjacent pegs enclose the same angle about the center axis with respect to one another.

4. The connecting device as claimed in claim 1, wherein all end faces run together about the center axis in an n-fold rotationally symmetrical manner.

5. The connecting device as claimed in claim 1,
    wherein the angle which the end faces enclose with the base area decreases from a center of the end face to an edge of the end face in the direction of a circumference about the center axis.

6. The connecting device as claimed claim 1,
wherein all the end faces run parallel to a common circular line.

7. The connecting device as claimed in claim 1,
wherein the base area has a circular circumference.

8. The connecting device as claimed in claim 1, wherein the angle which the inner wall encloses with the contact surface in the region of the retaining portions increases proceeding from the respective insert portion adjoined by the corresponding retaining portion.

9. The connecting device as claimed in claim 1,
wherein the inner wall, in a manner adjoining each of the retaining portions, at an stop region of the inner wall spacing from the depression axis that is smaller than the smallest spacing between the inner wall and the depression axis in the retaining portion.

10. The connecting device as claimed in claim 1, wherein the contact surface has a circular circumference.

11. The connecting device as claimed in claim 1,
wherein the negative connecting element has a shaped element, wherein the shaped element is delimited by a cylindrical wall, the cylinder axis of which is perpendicular to the contact surface, said cylindrical wall projecting beyond a plane in which the contact surface extends, and
wherein the positive connecting element has an opening around the center axis, the internal diameter of which is equal to the external diameter of the cylindrical wall.

12. The connecting device as claimed in claim 1, wherein the positive connecting element has an abrading means on a side of the base area that faces away from the elevation, or wherein the negative connecting element has an abrading means on its side facing away from the depression.

13. A connecting device comprising a negative connecting element,
wherein the negative connecting element has a contact surface with a depression which is introduced in the contact surface,
wherein the depression is delimited in a radial direction with respect to a depression axis perpendicular to the contact surface by an inner wall of the depression,
wherein the inner wall has n insert portions with an insert radius with respect to the depression axis, where n is greater than or equal to two,
wherein the inner wall has 2n retaining portions, wherein each side of each of the n insert portions is adjacent to one of the $2n$ retaining portions along the inner wall such that a retaining state can be achieved by rotating the positive connecting element with respect to the negative connecting element in either direction about the depression axis or the center axis; wherein the inner wall of the depression has a stop region adjoining each of the retaining portions to delimit the respective retaining portion at its end facing away from that insert portion to which the retaining portion is adjacent
wherein the inner wall in a region of each of the retaining portions encloses an angle of greater than 270° with the contact surface and has a maximum spacing at a point at which the inner wall adjoins the contact surface, referred to as the retaining spacing, from the depression axis that is smaller than the insert radius.

14. The connecting device as claimed in claim 13, wherein the angle which the inner wall encloses with the contact surface in the region of the retaining portion increases proceeding from the respective insert portion adjoined by the corresponding retaining portion.

15. The connecting device as claimed in claim 13, wherein the stop region of the inner wall has a spacing from the depression axis that is smaller than the smallest spacing between the inner wall and the depression axis in the retaining portion.

16. The connecting device as claimed in claim 13, wherein the contact surface has a circular circumference.

* * * * *